United States Patent [19]
Herzig et al.

[11] Patent Number: 5,869,628
[45] Date of Patent: Feb. 9, 1999

[54] DISPERSE DYES

[75] Inventors: Paul Herzig; Antoine Clément, both of Basel, Switzerland

[73] Assignee: Ciba Specialty Chemicals Corporation, Tarrytown, N.Y.

[21] Appl. No.: 918,883

[22] Filed: Aug. 26, 1997

[30]     Foreign Application Priority Data

Aug. 26, 1996 [CH] Switzerland ............................ 2088/96

[51] Int. Cl.$^6$ ............................ C09B 29/085; D06P 1/18; D06P 3/54
[52] U.S. Cl. .............................. 534/854; 534/581; 8/693; 8/922
[58] Field of Search ............................................. 534/854

[56]             References Cited

U.S. PATENT DOCUMENTS

| | | | |
|---|---|---|---|
| 2,373,700 | 4/1945 | McNally et al. | 534/854 |
| 3,637,652 | 1/1972 | Fishwick | 534/854 |
| 5,532,344 | 7/1996 | Himeno et al. | 534/581 |
| 5,550,217 | 8/1996 | Trottmann | 534/732 |

FOREIGN PATENT DOCUMENTS

| | | |
|---|---|---|
| 0555179 | 8/1993 | European Pat. Off. . |
| 0563975 | 10/1993 | European Pat. Off. . |
| 0623654 | 11/1994 | European Pat. Off. . |
| 2289549 | 5/1976 | France . |
| 435500 | 10/1967 | Switzerland . |
| 1519594 | 8/1978 | United Kingdom . |
| 2030169 | 4/1980 | United Kingdom . |

OTHER PUBLICATIONS

Chemical Abstracts, 94:67273, (1981).
Derwent Abst. 80–75850C.

*Primary Examiner*—Fiona T. Powers
*Attorney, Agent, or Firm*—David R. Crichton

[57]           ABSTRACT

Disperse dyes of formula

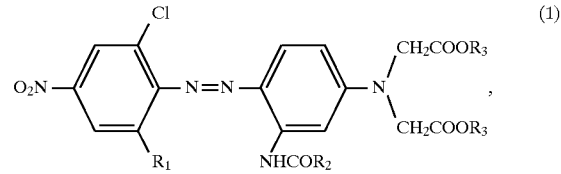

(1)

wherein
 $R_1$ is chloro or bromo,
 $R_2$ is methyl or ethyl, and
 $R_3$ is methyl or ethyl.

The dyes are particularly suitable for dyeing or printing polyester fiber textile material.

13 Claims, No Drawings

DISPERSE DYES

The present invention relates to disperse dyes, to a process for their preparation as well as to their use for dyeing or printing semi-synthetic or synthetic hydrophobic fibre materials.

Disperse dyes, i.e. dyes which are devoid of water-solubilising groups, have long been known in the art and are used for dyeing hydrophobic textile materials. Often, however, the resultant dyeings are not sufficiently fast to thermomigration. This problem occurs in particular with red to brown shades.

It is an object of this invention to provide disperse dyes with which dyeings are obtained that are very fast to thermomigration and which nevertheless have a good build-up capacity in the exhaust and thermosol processes as well as in textile printing. The dyes are also suitable for discharge printing.

The dyes of this invention conform to the formula

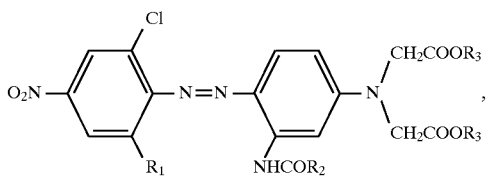

wherein
$R_1$ is chloro or bromo,
$R_2$ is methyl or ethyl, and
$R_3$ is methyl or ethyl.
$R_1$ is preferably chloro.
$R_2$ is preferably methyl.
$R_3$ is preferably methyl.
Particularly preferred is the dye of formula

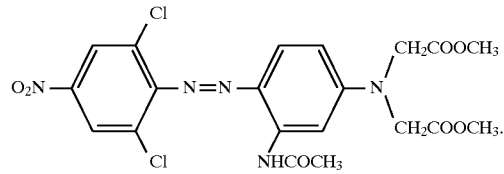

The dyes of formula (1) can be prepared by methods which are known per se, conveniently by diazotising a compound of formula

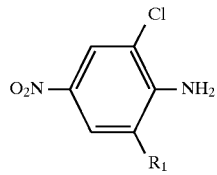

and coupling the diazonium salt of this compound to a coupling component of formula

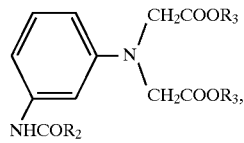

wherein $R_1$, $R_2$ and $R_3$ are as defined for formula (1).

The diazotisation of the compounds of formula (2) is carried out in per se known manner, for example with sodium nitrite in acid, typically hydrochloric or sulfuric acid, aqueous medium. The diazotisation can, however, also be carried out with other diazotising agents, conveniently with nitrosylsulfuric acid. The reaction medium of the diazotisation may contain an additional acid, typically phosphoric acid, sulfuric acid, acetic acid, propionic acid, hydrochloric acid or mixtures of these acids, for example mixtures of phosphoric acid and acetic acid. The diazotisation is conveniently carried out in the temperature range from $-10°$ to $30°$ C., preferably from $-10°$ C. to room temperature.

The coupling of the diazotised compound of formula (2) to the coupling component of formula (3) is likewise carried out in known manner, conveniently in acid, aqueous or aqueous-organic medium, preferably in the temperature range from $-10°$ to $30°$ C., most preferably below $10°$ C. Suitable acids include hydrochloric acid, acetic acid, sulfuric acid or phosphoric acid. Diazosation and coupling may be typically carried out in the same reaction medium.

The diazo components of formula (2) and the coupling components of formula (3) are known or can be prepared in per se known manner.

The novel dyes of formula (1) can be used for dyeing and printing semi-synthetic and, preferably, synthetic hydrophobic fibre materials, especially textile materials. Textile materials made from blends that contain such semi-synthetic or synthetic hydrophobic fibre materials can also be dyed or printed with the novel dyes.

Semi-synthetic textile materials are in particular cellulose secondary acetate and cellulose triacetate.

Synthetic hydrophobic textile materials consist primarily of linear aromatic polyesters, typically those from terephthalic acid and glycols, especially ethylene glycol, or condensates of terephthalic acid and 1,4-bis(hydroxymethyl)cyclohexane; of polycarbonates, typically those from α,α-dimethyl-4,4'-dihydroxydiphenylmethane and phosgene, or of fibres based on polyvinylchloride and polyamide.

The novel dyes are applied to the textile materials by known deying methods. Typically, polyester fibre materials are dyed from an aqueous dispersion by the exhaust process in the presence of customary anionic or nonionic dispersants and in the presence or absence of customary swelling agents (carriers) in the temperature range from $80°$ to $140°$ C. Cellulose secondary acetate is preferably dyed at a temperature from about $65°$ to $85°$ C., and cellulose triacetate at temperatures of up to $115°$ C.

The novel dyes do not stain wool and cotton simultaneously present in the dyebath or effect only minor staining (very good resist), so that they can also readily be used for dyeing polyester/wool and polyester/cellulose blends.

The novel dyes are suitable for dyeing by the thermosol process, for exhaust dyeing and for printing. The exhaust dyeing process is preferred. The liquor ratio depends on the apparatus used, on the substrate and on the form of presentation. However, it may be chosen from a wide range, e.g. from 1:4 to 1:100, but is preferably in the range from 1:6 to 1:25.

The textile material may be in any form of presentation, such as fibre, thread or nonwoven fabric, or wovens or knitgoods.

It is expedient to convert the novel dyes, before use, into a dye formulation. This is done by milling the dye to an average particle size of 0.1 to 10 microns. Milling can be carried out in the presence of dispersants. Typically, the dried dye is milled with a dispersant, or kneaded in paste form with a dispersant, and thereafter dried under vacuum or by spray dyeing. Printing pastes and dyebaths can be prepared by adding water to the formulations so obtained.

The customary thickeners will be used for printing. Typical examples of such thickeners are alginates, British gum, gum arabic, crystal gum, carob bean gum, tragacanth, carboxymethylcellulose, hydroxyethylcellulose, starch or synthetic products, including polyacrylamides, polyacrylic acid or copolymers thereof, or polyvinyl alcohols.

The cited materials, especially polyester material, are dyed with the novel dyes in level brown shades having very good end-use properties, in particular good fastness to light and to sublimation. The excellent good fastness to washing and, in particular, to thermomigration merits particular mention. The novel dyes are also distinguished by good exhaustion and build-up.

The novel dyes can also be readily used for obtaining mixed shades in conjunction with other dyes.

Further objects of the invention are the aforementioned use of the dyes of this invention and a process for dyeing or printing semi-synthetic or synthetic hydrophobic fibre material, preferably textile material, which comprises applying the novel dyes to said material or incorporating them therein. The cited hydrophobic fibre material is preferably polyester textile material. Other substrates which can be treated by the process of this invention and preferred process conditions have been discussed above in the more detailed description of the use of the novel dyes.

The hydrophobic fibre material, preferably polyester textile material, dyed or printed by this process, also constitutes an object of this invention.

The novel dyes of formula (1) are also suitable for modern marking methods, for example heat transfer printing.

The invention is illustrated in more detail by the following Examples in which, unless otherwise stated, parts and percentages are by weight. Temperatures are given in degrees Celsius. The relationship between parts by weight and parts by volume is the same as that of the gramme and the cubic centimetre.

EXAMPLE 1

41.4 parts by weight of 2,6-dichloro-4-nitroaniline are added to 138 parts by weight of 92% sulfuric acid at a temperature of 20° to 30° C. This reaction mixture is stirred at 30° C. until a clear solution is obtained. To this reaction mixture are added dropwise 63.5 parts by weight of nitrosylsulfuric acid over 20 minutes and stirring is continured for 90 minutes at 25° to 30° C. The resulting diazo solution is then added dropwise to a solution consisting of 61.7 parts by weight of methyl (N-3-acetaminophenyl)-N-methoxycarbonylmethylaminoacetate in 130 parts by weight of acetic acid over 90 minutes, the reaction temperature being kept at 5° to 15° C. by the addition of ice. When the addition of the diazo solution is complete, the mixture is stirred for another 1 hour. To this mixture are added dropwise 370 parts by weight of a 30% aqueous NaOH solution over 50 minutes, the temperature being kept at 40° C. by the addition of ice. The resulting precipitate is collected by suction filtration and washed with water giving, after drying, 101 parts by weight of a brown dye of formula (1a) having a melting point of 170°–173° C. This dye dyes polyester textile material in a brown shade having good fastness properties, in particular good fastness to thermomigration and light.

EXAMPLES 2–8

The dyes listed in Table 1 can be prepared in general analogy to the instruction of Example 1. They also dye the polyester textile material in a brown shade having good fastness properties, in particular good fastness to thermomigration and light.

TABLE 1

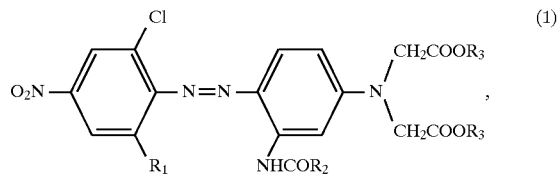

| Example No. | $R_1$ | $R_2$ | $R_3$ |
|---|---|---|---|
| 2 | Cl | $C_2H_5$ | $CH_3$ |
| 3 | Cl | $CH_3$ | $C_2H_5$ |
| 4 | Cl | $C_2H_5$ | $C_2H_5$ |
| 5 | Br | $CH_3$ | $CH_3$ |
| 6 | Br | $C_2H_5$ | $CH_3$ |
| 7 | Br | $CH_3$ | $C_2H_5$ |
| 8 | Br | $C_2H_5$ | $C_2H_5$ |

What is claimed is:

1. A dye of formula

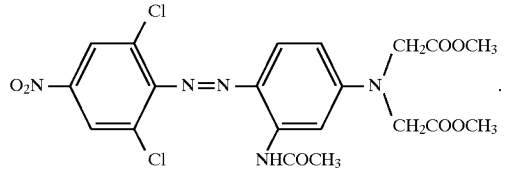

(1)

wherein
  $R_1$ is chloro or bromo,
  $R_2$ is methyl or ethyl, and
  $R_3$ is methyl or ethyl.
2. A dye according to claim 1, wherein $R_1$ is chloro.
3. A dye according to claim 1, wherein $R_2$ is methyl.
4. A dye according to claim 1, wherein $R_3$ is methyl.
5. A dye according to claim 1 of formula

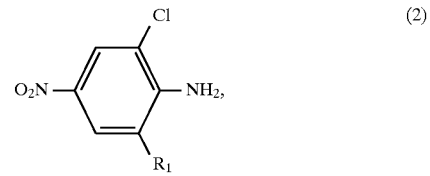

6. A process for the preparation of a dye of formula (1) according to claim 1, which comprises diazotising a compound of formula

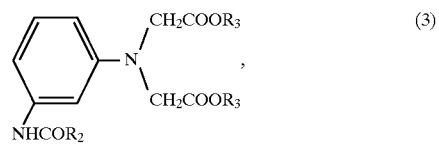

(2)

wherein $R_1$ is chloro or bromo, and coupling the diazonium salt of this compound to a coupling component of formula (3)

wherein $R_2$ is methyl or ethyl, and $R_3$ is methyl or ethyl.

7. A process for dyeing or printing semi-synthetic or synthetic hydrophobic fibre material, which comprises applying to, or incorporating in, said material one or more than one dye as defined in claim 1.

8. A process according to claim 7, wherein the semi-synthetic or synthetic hydrophobic fibre material is a textile material.

9. A process according to claim 7, wherein the material consists of polyester fibres.

10. The material dyed or printed by a process as claimed in claim 7.

11. A process according to claim 8, wherein the material consists of polyester fibers.

12. The material dyed or printed by a process as claimed in claim 8.

13. The material dyed or printed by a process as claimed in claim 9.

\* \* \* \* \*